(12) United States Patent
Li et al.

(10) Patent No.: US 11,761,801 B2
(45) Date of Patent: Sep. 19, 2023

(54) MULTI-LAYER OPEN CHANNEL PORTABLE FLOW MEASURING DEVICE BASED ON WATER IMPULSE PRINCIPLE AND FLOW MEASURING METHOD

(71) Applicant: Soil and Water Conservation Monitoring Center of Pearl River Basin, Pearl River Water Resources Commission of the Ministry of Water Resources, Guangzhou (CN)

(72) Inventors: Hao Li, Guangzhou (CN); Le Li, Guangzhou (CN); Bin Liu, Guangzhou (CN); Pingwei Jin, Guangzhou (CN); Jun Huang, Guangzhou (CN); Xuebing Jiang, Guangzhou (CN); Xinyue Kou, Guangzhou (CN); Liping Lin, Guangzhou (CN); Zhou Xu, Guangzhou (CN); Guangyan Wu, Guangzhou (CN); Bin Yin, Guangzhou (CN); Xiaolin Liu, Guangzhou (CN)

(73) Assignee: Soil and Water Conservation Monitoring Center of Pearl River Basin, Pearl River Water Resources Commission of the Ministry of Water Resources, Guangzhou (CN)

( * ) Notice: Subject to any disclaimer, the term of this patent is extended or adjusted under 35 U.S.C. 154(b) by 0 days.

(21) Appl. No.: 18/089,733

(22) Filed: Dec. 28, 2022

(65) Prior Publication Data
US 2023/0258485 A1    Aug. 17, 2023

(30) Foreign Application Priority Data

Feb. 14, 2022    (CN) .......................... 202210135922.8

(51) Int. Cl.
    *G01F 1/002*    (2022.01)
    *G01L 5/04*     (2006.01)
    *G01F 1/37*     (2006.01)

(52) U.S. Cl.
    CPC .............. *G01F 1/002* (2013.01); *G01F 1/005* (2013.01); *G01F 1/37* (2013.01); *G01L 5/04* (2013.01)

(58) Field of Classification Search
    CPC .......... G01F 1/002; G01F 1/005; G01F 1/206; G01F 1/28
    See application file for complete search history.

(56) References Cited

U.S. PATENT DOCUMENTS 4,593,561 A * 6/1986 Gavrilovic .............. G01F 1/002
                                                    73/170.29
5,734,111 A * 3/1998 Hak Soo ................. B63B 35/44
                                                    73/170.13

(Continued)

*Primary Examiner* — Erika J. Villaluna
(74) *Attorney, Agent, or Firm* — Bay State IP, LLC

(57) ABSTRACT

The present disclosure provides a multi-layer open channel portable flow measuring device based on a water impulse principle and a flow measuring method; an instantaneous water head height of a water-carrying section, namely, a water level H is measured through a pressure sensor at a bottom of a U-shaped hollow tube; at the same time, layered multi-point velocity measuring components in equidistant layout include a series of position "current meters" composed of tension sensors, hollow punching lightweight steel balls and lightweight elastic steel ropes to measure velocities $V_{1-n}$ of different points, n depends on the layer decided to be arranged according to a channel depth, an instantaneous flow value of the whole water-carrying section is further acquired through multi-layer flow accumulation, and with a simple structure, intelligent control, easy operation and convenient carrying, the present disclosure may further improve the flow measuring precision.

8 Claims, 4 Drawing Sheets

(56) References Cited

U.S. PATENT DOCUMENTS

| | | | |
|---|---|---|---|
| 9,529,107 B2* | 12/2016 | Manin | G01V 1/3808 |
| 2011/0176383 A1* | 7/2011 | Jewell | G01V 1/3852 |
| | | | 367/16 |

* cited by examiner

MULTI-LAYER OPEN CHANNEL PORTABLE FLOW MEASURING DEVICE BASED ON WATER IMPULSE PRINCIPLE AND FLOW MEASURING METHOD

CROSS REFERENCE TO RELATED APPLICATION

This application claims the benefit of and takes priority from Chinese Patent Application No. 202210135922.8 filed on Feb. 14, 2022, the contents of which are herein incorporated by reference.

TECHNICAL FIELD

The present disclosure belongs to the technical field of open channel flow measuring devices, and relates to a multi-layer open channel portable flow measuring device based on a water impulse principle. The present disclosure further relates to a method for flow measurement by adopting the above multi-layer open channel portable flow measuring device based on the water impulse principle.

BACKGROUND

As the material basis for creatures to live on the earth, water resource is the primary condition to maintain the sustainable development of the ecological environment of the earth. Our country is one of 13 countries lacking of water in the world. As an agricultural country, it is extremely urgent to improve the water use efficiency and reduce the water waste, and saving water in irrigated regions becomes very important. The channel flow measurement is used as the effective measure to save water, improve irrigation quality and irrigation efficiency in the irrigated regions, and accurate flow measurement is the key to ensure the effective utilization of the water resource. However, the existing channel flow measuring device has more or less technical difficulties, such as low accuracy and low applicability. At present, the main flow measuring method is the velocity area method, the mean velocity of a cross section of an open channel or the velocity of a velocity representative section of a point is mainly measured through a measuring structure flow measuring method, an ultrasonic wave (time-difference method), a Doppler method and the like; and the instantaneous flow of the channel is acquired in combination with the area of a U-shaped or rectangular standard flow measuring section. However, the equipment has the disadvantages of rigorous field installation requirements, high cost, low flow measuring precision, and low velocity representativeness of the flow measuring point, etc. Therefore, how to research a flow measuring device with accurate flow measurement, low cost, stable performance and convenient carrying is very important to the accurate flow measurement of the channel, and this research provides a new flow measuring device and a method for these difficulties.

SUMMARY

The purpose of the present disclosure is to provide a multi-layer open channel portable flow measuring device based on a water impulse principle, thereby solving the problem of low precision of the flow measuring device in the prior art.

The present disclosure adopts the following technical solution: a multi-layer open channel portable flow measuring device based on a water impulse principle, including a U-shaped hollow tube, wherein horizontal object stages are fixed at the two ends of the U-shaped hollow tube, and a pressure sensor is arranged at a bottom center of the U-shaped hollow tube; a plurality of hollow lightweight steel balls are uniformly distributed on a central axis of the U-shaped hollow tube, and each hollow lightweight steel ball is integrally connected to the U-shaped hollow tube through lightweight elastic steel ropes arranged in parallel to each other; and an end head, connected to the U-shaped hollow tube, of each lightweight elastic steel rope is provided with a tension sensor, the tension sensor and the pressure sensor are respectively connected to a data collection and transmission module through a data transmission signal wire, and the data collection and transmission module is in wireless connection with a controller.

The present disclosure is also characterized in that,
the data transmission signal wire is internally arranged in the U-shaped hollow tube, and an upward end of the data transmission signal wire passes through the horizontal object stages and is connected to the data collection and transmission module.

Two level gauges are horizontally arranged on the horizontal object stages, and the two level gauges are perpendicular to each other.

The data collection and transmission module is connected to the controller through a data transmission antenna.

As a control center, the controller is an intelligent display controller.

Leveling knobs in a vertical direction are also arranged on the horizontal object stages.

Five hollow lightweight steel balls are provided.

The second technical solution adopted by the present disclosure is a flow measuring method for a multi-layer open channel portable flow measuring device based on a water impulse principle, and the method specifically includes the following steps of:

Step 1: placing a flow measuring device above a channel, so that a bottom of a U-shaped hollow tube is in contact with a channel bottom, thereby measuring a height of a water head through a pressure sensor; regulating the levelness of horizontal object stages of the flow measuring device through leveling knobs; and powering on the flow measuring device for measurement, sending the measured data to a controller through a data collection and transmission module, and viewing the measured historical data and the real-time data on a display;

Step 2: calculating an instantaneous flow value Q of a water-carrying section according to the data collected in Step 1, and the specific calculation method is as follows:

$$Q = \sum_{1}^{n=5}(A_n V_n)$$

wherein $A_n$ is the area of the cross section of different section shapes corresponding to the hollow lightweight steel balls, $$A_1 = \frac{1}{2}L_1 \Delta H,$$

$$A_2 = \frac{(L_1 + L_2)}{2}\Delta H,$$

$$A_3 = \frac{(L_2 + L_3)}{2}\Delta H$$

$$A_4 = \frac{(L_3 + L_4)}{2}\Delta H,$$

$$A_5 = \frac{(L_4 + L_5)}{2}\Delta H,$$

$$A_6 = \frac{[L_5 + (H - 5 \times \Delta H)]}{2}\Delta H$$

$V_n$ is the mean velocity of the area of the cross section of different section shapes, $$V_1 = \left[\frac{2F_{1-1}\sqrt{F_{1-1}(KL_1 + F_{1-1})}}{KL_1 + 2F_{1-1}} + \frac{2F_{1-2}\sqrt{F_{1-2}(KL_1 + F_{1-2})}}{KL_1 + 2F_{1-2}}\right]/M_1$$

$$V_2 = \left[\frac{2F_{2-1}\sqrt{F_{2-1}(KL_2 + F_{2-1})}}{KL_2 + 2F_{2-1}} + \frac{2F_{2-2}\sqrt{F_{2-2}(KL_2 + F_{2-2})}}{KL_2 + 2F_{2-2}}\right]/M_2$$

$$V_3 = \left[\frac{2F_{3-1}\sqrt{F_{3-1}(KL_3 + F_{3-1})}}{KL_3 + 2F_{3-1}} + \frac{2F_{3-2}\sqrt{F_{3-2}(KL_3 + F_{3-2})}}{KL_3 + 2F_{3-2}}\right]/M_3$$

$$V_4 = \left[\frac{2F_{4-1}\sqrt{F_{4-1}(KL_4 + F_{4-1})}}{KL_4 + 2F_{4-1}} + \frac{2F_{4-2}\sqrt{F_{4-2}(KL_4 + F_{4-2})}}{KL_4 + 2F_{4-2}}\right]/M_4$$

$$V_5 = \left[\frac{2F_{5-1}\sqrt{F_{5-1}(KL_5 + F_{5-1})}}{KL_5 + 2F_{5-1}} + \frac{2F_{5-2}\sqrt{F_{5-2}(KL_5 + F_{5-2})}}{KL_5 + 2F_{5-2}}\right]/M_5$$

wherein $L_1$, $L_2$, $L_3$, $L_4$, $L_5$ are the initial lengths of five lightweight elastic steel ropes without external force; $F_{1-1}$, $F_{1-2}$; $F_{2-1}$, $F_{2-2}$; $F_{3-1}$, $F_{3-2}$; $F_{4-1}$, $F_{4-2}$; $F_{5-1}$, $F_{5-2}$ are tension values of the corresponding five pairs of tension sensors after receiving the water impact and reaching stability; $M_1=M_2=M_3=M_4=M_5=M$ is the mass of the hollow lightweight steel balls; K is an elastic deformation value of each lightweight elastic steel rope; H is a height of a water head of a water-carrying section, which is acquired through a pressure sensor, and $\Delta H$ is a vertical distance between the adjacent tension sensors.

The Present Disclosure has the Following Beneficial Effects:

The multi-layer open channel portable flow measuring device based on the water impulse principle provided by the present disclosure has a novel and unique structure, and the accurate detection for the height of the water head of the channel cross-section, that is, the water level is completed by adopting one pressure sensor; at the same time, the velocities $V_{1-n}$ (n depends on the layer decided to be arranged according to the channel depth) of different points are measured in combination with layered multi-point velocity measuring components (a series of position "current meters" mainly composed of tension sensors, hollow lightweight steel balls and lightweight elastic steel ropes) in equidistant layout, and then the instantaneous flow value of the whole water-carrying section is further acquired through multi-layer flow accumulation. As long as the flow measuring device is accurately installed above the channel and powered on, the online flow remote monitoring may be achieved through the wireless controller, and with a simple structure, low power consumption, convenient carrying and low installation cost, the device can realize the wireless data transmission and be widely applied in the flow measuring work in the current irrigated regions.

Figure 1:
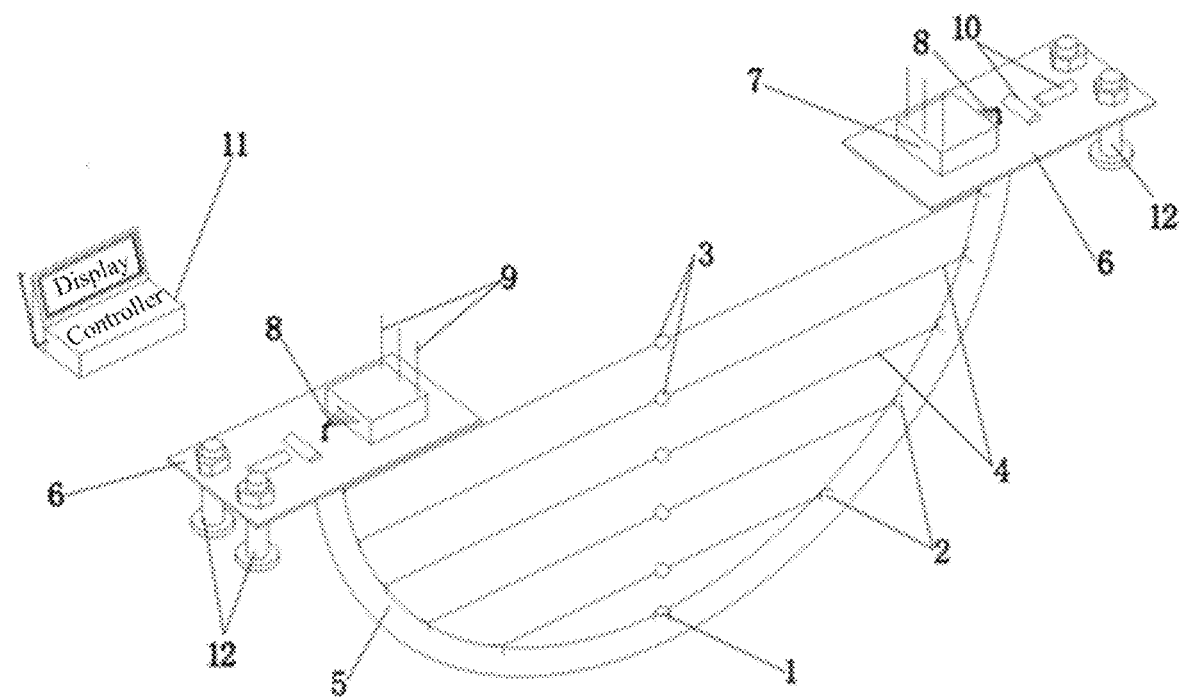
FIG. 1 is a schematic diagram of an overall structure of a multi-layer open channel portable flow measuring device based on a water impulse principle in the present disclosure.

In the drawing: 1: pressure sensor; 2: tension sensor; 3: hollow lightweight steel ball; 4: lightweight elastic steel rope; 5: U-shaped hollow tube; 6: horizontal object stage; 7: data collection and transmission module; 8: data transmission signal wire; 9: data transmission antenna; 10: level gauge; 11: controller; 12: leveling knob.

DETAILED DESCRIPTION OF THE EMBODIMENTS

The implementation modes of the present disclosure will be described in detail below in conjunction with the drawings. The embodiment is implemented under the precondition of the technical solution of the present disclosure, and the detail implementation modes and specific operation process are provided, but the protection scope of the present disclosure is not limited to the following embodiments.

Figure 2:
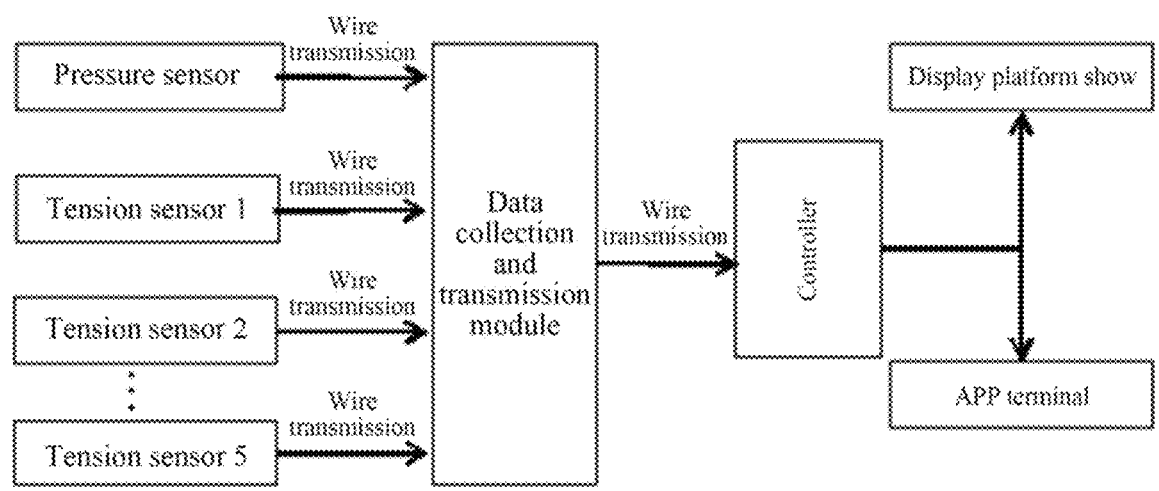
FIG. 2 is a schematic diagram of an electric structure of a multi-layer open channel portable flow measuring device based on a water impulse principle in the present disclosure.

The structure of a multi-layer open channel portable flow measuring device based on a water impulse principle provided by the present disclosure is as shown in FIG. 1 to FIG. 2, including a U-shaped hollow tube 5, wherein horizontal object stages 6 are fixed at the two ends of the U-shaped hollow tube 5, and a pressure sensor 1 is arranged at a bottom center of the U-shaped hollow tube 5; a plurality of hollow lightweight steel balls 3 are uniformly distributed on a central axis of the U-shaped hollow tube 5, and each hollow lightweight steel ball 3 is integrally connected to the U-shaped hollow tube 5 through lightweight elastic steel ropes 4 arranged in parallel to each other; and an end head, connected to the U-shaped hollow tube 5, of each lightweight elastic steel rope 4 is provided with a tension sensor 2, the tension sensor 2 and the pressure sensor 1 are respectively connected to a data collection and transmission module 7 through a data transmission signal wire 8, and the data collection and transmission module 7 is in wireless connection with a controller 11.

The data transmission signal wire 8 is built in the U-shaped hollow tube 5, and an upward end of the data transmission signal wire 8 passes through the horizontal object stages 6 and is connected to the data collection and transmission module 7.

Two level gauges 10 are horizontally arranged on the horizontal object stages 6, and the level gauges are perpendicular to each other.

The data collection and transmission module 7 is connected to the controller 11 through a data transmission antenna 9.

As a control center, the controller 11 is an intelligent display controller, which is configured to receive the measured sensor data collected by the data collection and transmission module.

Leveling knobs 12 in a vertical direction are also arranged on the horizontal object stages 6.

Five hollow lightweight steel balls 3 are provided.

In the present disclosure, the U-shaped hollow tube, the lightweight steel balls, the elastic steel ropes and the horizontal object stages are made of stainless steel, so as not to deform or be corroded in water, thereby ensuring its flow measuring precision.

During the design and production, those skilled in the art may determine the size of the U-shaped hollow tube, the lightweight steel balls and the elastic steel ropes in the present disclosure according to the channel size suitable for the device.

The measuring principle of the present disclosure is as follows: the flow measuring device in the present disclosure divides the water-carrying sections into a standard isosceles triangle and a standard isosceles trapezoid, a multi-layer flow value is acquired by using an area formula for different velocities corresponding to different layers, and after accumulation, the instantaneous flow value of the whole water-carrying section is acquired. During the specific use of the device and the method, the operation for the device is simple and easy to learn, so unskilled persons are suitable for operating the device, and it is convenient to promote.

A flow measuring method for the multi-layer open channel portable flow measuring device based on the water impulse principle, specifically including the following steps of:

Step 1: placing a flow measuring device above a channel, so that a bottom of a U-shaped hollow tube is in contact with a channel bottom, regulating the levelness of horizontal object stages of the flow measuring device through leveling knobs; and powering on the flow measuring device for measurement, sending the measured data to a controller through a data collection and transmission module, and viewing the measured historical data and the real-time data on the controller.

Figure 3:
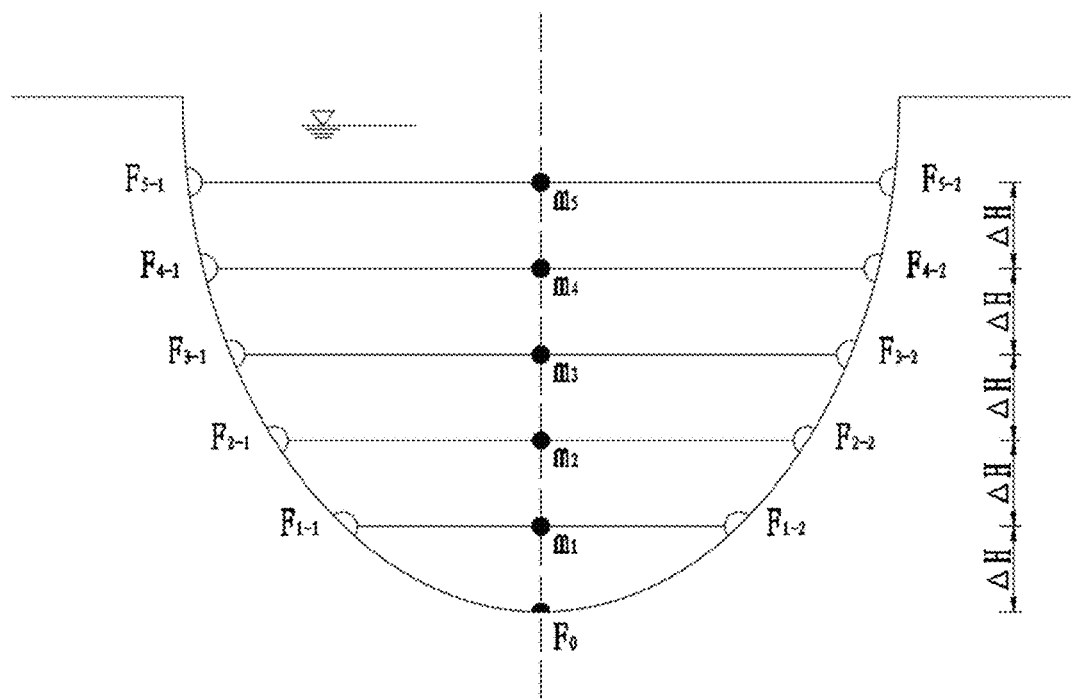
FIG. 3 is an overall technical schematic diagram of the present disclosure.
Figure 4:
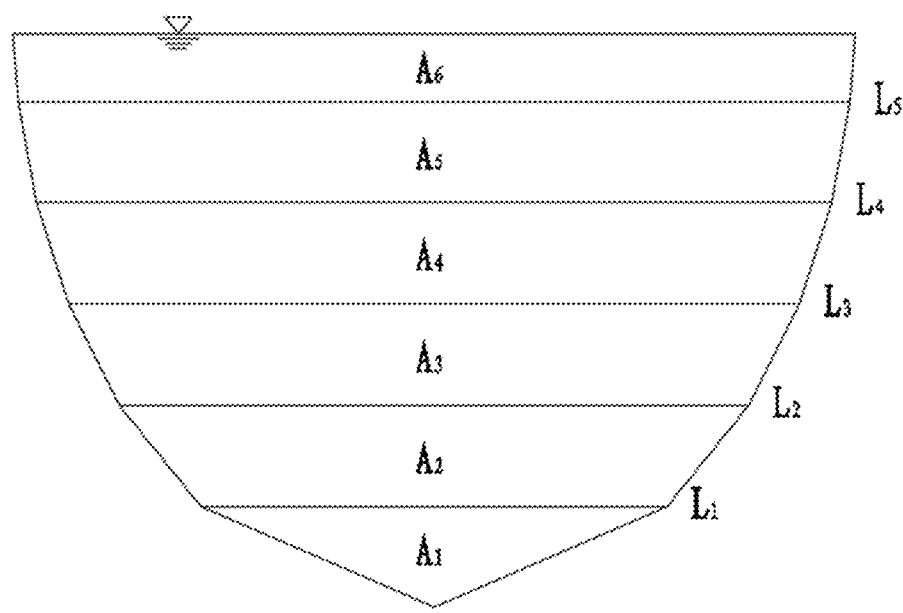
FIG. 4 is a segmentation diagram of a water-carrying section layer of the present disclosure.
Figure 5:
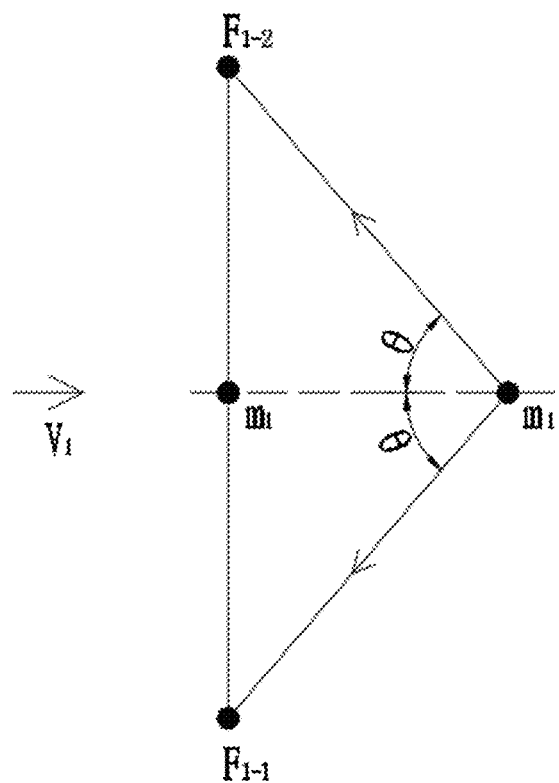
FIG. 5 is a mechanics distribution diagram for flow measurement of the present disclosure.

Step 2: the device obtaining the water head height of the channel section, namely, the water level H through water pressure received by the pressure sensor after conversion; at the same time, measuring velocities $V_{1-n}$ (n depends on the layer decided to be arranged according to the channel depth) of different points in combination with layered multi-point velocity measuring components (a series of position "current meters" mainly composed of tension sensors, hollow punching lightweight steel balls and lightweight elastic steel ropes) in equidistant layout, wherein in the present disclosure, n=5, the instantaneous flow value Q of the whole water-carrying section is further acquired through multi-layer flow accumulation, as shown in FIG. 3 to FIG. 5, the specific calculation method is as follows:

$$Q = \sum_{1}^{n=5}(A_n V_n)$$

wherein $A_n$ is the area of the cross section of different section shapes corresponding to the hollow lightweight steel balls, $$A_1 = \frac{1}{2}L_1 \Delta H,$$

$$A_2 = \frac{(L_1 + L_2)}{2}\Delta H,$$

$$A_3 = \frac{(L_2 + L_3)}{2}\Delta H$$

$$A_4 = \frac{(L_3 + L_4)}{2}\Delta H,$$

$$A_5 = \frac{(L_4 + L_5)}{2}\Delta H,$$

$$A_6 = \frac{[L_5 + (H - 5 \times \Delta H)]}{2}\Delta H$$

$V_n$ is the mean velocity of the area of the cross section of different section shapes, $$V_1 = \left[\frac{2F_{1-1}\sqrt{F_{1-1}(KL_1 + F_{1-1})}}{KL_1 + 2F_{1-1}} + \frac{2F_{1-2}\sqrt{F_{1-2}(KL_1 + F_{1-2})}}{KL_1 + 2F_{1-2}}\right]/M_1$$

$$V_2 = \left[\frac{2F_{2-1}\sqrt{F_{2-1}(KL_2 + F_{2-1})}}{KL_2 + 2F_{2-1}} + \frac{2F_{2-2}\sqrt{F_{2-2}(KL_2 + F_{2-2})}}{KL_2 + 2F_{2-2}}\right]/M_2$$

$$V_3 = \left[\frac{2F_{3-1}\sqrt{F_{3-1}(KL_3 + F_{3-1})}}{KL_3 + 2F_{3-1}} + \frac{2F_{3-2}\sqrt{F_{3-2}(KL_3 + F_{3-2})}}{KL_3 + 2F_{3-2}}\right]/M_3$$

$$V_4 = \left[\frac{2F_{4-1}\sqrt{F_{4-1}(KL_4 + F_{4-1})}}{KL_4 + 2F_{4-1}} + \frac{2F_{4-2}\sqrt{F_{4-2}(KL_4 + F_{4-2})}}{KL_4 + 2F_{4-2}}\right]/M_4$$

$$V_5 = \left[\frac{2F_{5-1}\sqrt{F_{5-1}(KL_5 + F_{5-1})}}{KL_5 + 2F_{5-1}} + \frac{2F_{5-2}\sqrt{F_{5-2}(KL_5 + F_{5-2})}}{KL_5 + 2F_{5-2}}\right]/M_5$$

wherein $L_1$, $L_2$, $L_3$, $L_4$, $L_5$ are the initial lengths of five lightweight elastic steel ropes without external force; $F_{1-1}$, $F_{1-2}$, $F_{2-1}$, $F_{2-2}$, $F_{3-1}$, $F_{3-2}$, $F_{4-1}$, $F_{4-2}$, $F_{5-1}$, $F_{5-2}$ are tension values of the corresponding five pairs of tension sensors after receiving the water impact and reaching stability; $M_1=M_2=M_3=M_4=M_5=M$ is the mass of the hollow lightweight steel balls; K is an elastic deformation value of each lightweight elastic steel rope; H is a height of a water head of a water-carrying section, which is acquired through a pressure sensor, and $\Delta H$ is a vertical distance between the adjacent tension sensors.

A flow measuring method for the multi-layer open channel portable flow measuring device based on the water impulse principle, the calculation process of the mean velocity of the area of the cross section of different section shapes, i.e. Vn, is described as follows:

Layered multi-point flow measurement components arranged at equal intervals are composed of tension sensor, hollow perforated light steel ball and light elastic steel rope. The specific working principle is that the water flow at different layers of the water passing section produces instantaneous impact force and impulse F per unit time on the corresponding light steel ball at this layer F Δ t=M (V−V0), where M is the mass of light steel ball; unit time Δ t=1; Initial speed V0=0; Then the flow velocity V of water is equal to the ratio between the component force F of spring force on the flow velocity and the mass M of hollow steel ball.

As shown in FIG. 5, the component force Fi of spring force on water flow velocity is the superposition of the pull forces Fi-1 and Fi-2 of a pair of tension sensors on the same layer in two directions, and the derivation formula is as follows:

Original length of elastic steel rope is Li;

After the water impacts the ball, the elastic steel rope will undergo elastic deformation. As shown in FIG. 5, the length of the elastic steel rope in the direction of each pair of tension sensors is $L/2+F_{1-1}/k$ ($L_1/2+F_{1-2}/k$);

It can be seen from the figure that:

$$b = \frac{L_i}{2}$$

$$c = \frac{L_i}{2} + \frac{F_{i-1}}{k}$$

$$a = \sqrt{c^2 - b^2} = \sqrt{\left(\frac{L_i}{2} + \frac{F_{i-1}}{K}\right)^2 - \left(\frac{L_i}{2}\right)^2} = \frac{\sqrt{F_{i-1}(kL_i + F_{i-1})}}{K}$$

$$\cos\theta_1 = \frac{a}{c} = \frac{2\sqrt{F_{i-1}(kL_i + F_{i-1})}}{kL_i + 2F_{i-1}}$$

Superimposition of tension force Fi-1 and Fi-2:

$$F_{i-1}\cos\theta_1 + F_{i-2}\cos\theta_2 =$$

$$\frac{2F_{i-1}\sqrt{F_{i-1}(kL_i + F_{i-1})}}{kL_i + 2F_{i-1}} + \frac{2F_{i-2}\sqrt{F_{i-2}(kL_i + F_{i-2})}}{kL_i + 2F_{i-2}}.$$

Where, i represents different layers of each hollow light steel ball, i=1, 2, . . . 5.

Thus, the Vn in the application can be obtained.

There are many kinds of flow measuring devices at home and abroad, but due to low measuring precision, difficult installation, limitation of using environments and the like, the using range of the flow measuring devices are limited, and the flow measuring device is hard to be promoted and used in a large scope. With a simple structure, high measuring precision, low power consumption and simple operation, the multi-layer open channel portable flow measuring device based on the water impulse principle and the method can solve the disadvantages of a discharge measurement method in the irrigated region at present to some extent, and achieve the online flow measurement and real-time monitoring, so the device and method have broad prospect.

The basic principles, main features and advantages of the present disclosure are described above, those skilled in the art shall understand that the present disclosure is not limited by the above implementation modes, the above implementation modes describe the principles of the present disclosure merely. Various changes and improvements will be made without deviating from the spirit and scope of the present the present disclosure, and all of these fall within the scope of protection of the present disclosure. The scope of protection of the present disclosure is defined by the attached claims and its equivalents.

What is claimed is:

1. A multi-layer open channel portable flow measuring device based on a water impulse principle, comprising a U-shaped hollow tube (5), wherein horizontal object stages (6) are fixed at the two ends of the U-shaped hollow tube (5), and a pressure sensor (1) is arranged at a bottom center of the U-shaped hollow tube (5); a plurality of hollow lightweight steel balls (3) are uniformly distributed on a central axis of the U-shaped hollow tube (5), and each hollow lightweight steel ball (3) is integrally connected to the U-shaped hollow tube (5) through lightweight elastic steel ropes (4) arranged in parallel to each other; and an end head, connected to the U-shaped hollow tube (5), of each lightweight elastic steel rope (4) is provided with a tension sensor (2), the tension sensor (2) and the pressure sensor (1) are respectively connected to a data collection and transmission module (7) through a data transmission signal wire (8), and the data collection and transmission module (7) is in wireless connection with a controller (11).

2. The multi-layer open channel portable flow measuring device based on the water impulse principle according to claim 1, wherein the data transmission signal wire (8) is internally arranged in the U-shaped hollow tube (5), and each upward end of the data transmission signal wire (8) passes through the horizontal object stages (6) and is connected to the data collection and transmission module (7).

3. The multi-layer open channel portable flow measuring device based on the water impulse principle according to claim 1, wherein two level gauges (10) are horizontally arranged on the horizontal object stages (6), and the two level gauges are perpendicular to each other.

4. The multi-layer open channel portable flow measuring device based on the water impulse principle according to claim 1, wherein the data collection and transmission module (7) is connected to the controller (11) through a data transmission antenna (9).

5. The multi-layer open channel portable flow measuring device based on the water impulse principle according to claim 1, wherein as a control center, the controller (11) is an intelligent display controller.

6. The multi-layer open channel portable flow measuring device based on the water impulse principle according to claim 1, wherein leveling knobs (12) in a vertical direction are also arranged on the horizontal object stages (6).

7. The multi-layer open channel portable flow measuring device based on the water impulse principle according to claim 1, wherein five hollow lightweight steel balls (3) are provided.

8. A flow measuring method for the multi-layer open channel portable flow measuring device based on the water impulse principle according to claim 1, wherein the specific operation steps are as follows:

Step 1: placing a flow measuring device above a channel, so that a bottom of a U-shaped hollow tube is in contact with a channel bottom, regulating the levelness of horizontal object stages of the flow measuring device through leveling knobs; and powering on the flow measuring device for measurement, sending the measured data to a controller through a data collection and transmission module, and viewing a measured historical data and a real-time data on a display;

Step 2: calculating an instantaneous flow value Q of a water-carrying section according to the data collected in Step 1, and a specific calculation method is as follows:

$$Q = \sum_{1}^{n=5}(A_n V_n)$$

wherein $A_n$ is the area of the cross section of different section shapes corresponding to the hollow lightweight steel balls, $$A_1 = \frac{1}{2}L_1\Delta H,$$

$$A_2 = \frac{(L_1 + L_2)}{2}\Delta H,$$

$$A_3 = \frac{(L_2 + L_3)}{2}\Delta H$$

$$A_4 = \frac{(L_3 + L_4)}{2} \Delta H,$$

$$A_5 = \frac{(L_4 + L_5)}{2} \Delta H,$$

$$A_6 = \frac{[L_5 + (H - 5 \times \Delta H)]}{2} \Delta H$$

$V_n$ is the mean velocity of the area of the cross section of different section shapes, $$V_1 = \left[ \frac{2F_{1-1}\sqrt{F_{1-1}(KL_1 + F_{1-1})}}{KL_1 + 2F_{1-1}} + \frac{2F_{1-2}\sqrt{F_{1-2}(KL_1 + F_{1-2})}}{KL_1 + 2F_{1-2}} \right] \Big/ M_1$$

$$V_2 = \left[ \frac{2F_{2-1}\sqrt{F_{2-1}(KL_2 + F_{2-1})}}{KL_2 + 2F_{2-1}} + \frac{2F_{2-2}\sqrt{F_{2-2}(KL_2 + F_{2-2})}}{KL_2 + 2F_{2-2}} \right] \Big/ M_2$$

$$V_3 = \left[ \frac{2F_{3-1}\sqrt{F_{3-1}(KL_3 + F_{3-1})}}{KL_3 + 2F_{3-1}} + \frac{2F_{3-2}\sqrt{F_{3-2}(KL_3 + F_{3-2})}}{KL_3 + 2F_{3-2}} \right] \Big/ M_3$$

$$V_4 = \left[ \frac{2F_{4-1}\sqrt{F_{4-1}(KL_4 + F_{4-1})}}{KL_4 + 2F_{4-1}} + \frac{2F_{4-2}\sqrt{F_{4-2}(KL_4 + F_{4-2})}}{KL_4 + 2F_{4-2}} \right] \Big/ M_4$$

$$V_5 = \left[ \frac{2F_{5-1}\sqrt{F_{5-1}(KL_5 + F_{5-1})}}{KL_5 + 2F_{5-1}} + \frac{2F_{5-2}\sqrt{F_{5-2}(KL_5 + F_{5-2})}}{KL_5 + 2F_{5-2}} \right] \Big/ M_5$$

wherein $L_1$, $L_2$, $L_3$, $L_4$, $L_5$ are the initial lengths of five lightweight elastic steel ropes without external force; $F_{1-1}$, $F_{1-2}$; $F_{2-1}$, $F_{2-2}$; $F_{3-1}$, $F_{3-2}$; $F_{4-1}$, $F_{4-2}$; $F_{5-1}$, $F_{5-2}$ are tension values of a corresponding five pairs of tension sensors after receiving a water impact and reaching stability; $M_1=M_2=M_3=M_4=M_5=M$ is the mass of the hollow lightweight steel balls; K is an elastic deformation value of each lightweight elastic steel rope; H is a height of a water head of a water-carrying section, which is acquired through a pressure sensor, and $\Delta H$ is a vertical distance between an adjacent tension sensors.

\* \* \* \* \*